(12) United States Patent
Shinohara et al.

(10) Patent No.: US 9,672,529 B2
(45) Date of Patent: Jun. 6, 2017

(54) ADVERTISEMENT TRANSLATION DEVICE, ADVERTISEMENT DISPLAY DEVICE, AND METHOD FOR TRANSLATING AN ADVERTISEMENT

(71) Applicant: PANASONIC CORPORATION, Osaka (JP)

(72) Inventors: Hiroki Shinohara, Kyoto (JP); Koichiro Yamaguchi, Osaka (JP); Ken-ichi Shibata, Osaka (JP); Tetsuya Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 461 days.

(21) Appl. No.: 14/218,282

(22) Filed: Mar. 18, 2014

(65) Prior Publication Data

US 2014/0288946 A1    Sep. 25, 2014

Related U.S. Application Data

(63) Continuation of application No. PCT/JP2013/004502, filed on Jul. 24, 2013.

(30) Foreign Application Priority Data

Mar. 22, 2013   (JP) ................................ 2013-059531

(51) Int. Cl.
   *G06F 17/28*   (2006.01)
   *G06F 9/44*    (2006.01)
   (Continued)

(52) U.S. Cl.
   CPC ....... *G06Q 30/0241* (2013.01); *G06F 17/211* (2013.01); *G06F 17/289* (2013.01); *G06F 9/4448* (2013.01); *G06F 17/2872* (2013.01)

(58) Field of Classification Search
   CPC ... G06F 17/2872; G06F 17/289; G06F 9/4448
   See application file for complete search history.

(56) References Cited

U.S. PATENT DOCUMENTS 5,373,441 A * 12/1994 Hirai ................... G06F 17/2872
                                                704/10
6,363,337 B1 * 3/2002 Amith ................. G06F 17/2872
                                                704/7
(Continued)

FOREIGN PATENT DOCUMENTS

JP   2001-238147 A   8/2001
JP   2002-189721 A   7/2002
(Continued)

OTHER PUBLICATIONS

International Search Report issued in International Application No. PCT/JP2013/004502 mailed Aug. 27, 2013, 6 pgs.

*Primary Examiner* — Samuel G Neway
(74) *Attorney, Agent, or Firm* — McDermott Will & Emery LLP

(57) ABSTRACT

An advertisement translation device is a device for translating an advertisement text displayed in a display area of a predetermined size in advertisement content, and displaying the translated advertisement text in the display area. The advertisement translation device includes: an advertisement text obtainment unit which obtains the advertisement text; a linguistic information obtainment unit which obtains linguistic information indicating a target language into which the advertisement text is to be translated; a translation unit which create translated text candidates by translating the advertisement text into the target language indicated by the linguistic information; and a selection unit which selects and outputs as a translated text, at least one of the translated text (Continued)

candidates a full text of which is displayable in a predetermined character size in the display area.

6 Claims, 11 Drawing Sheets

(51) Int. Cl.
    *G06Q 30/02*         (2012.01)
    *G06F 17/21*         (2006.01)

(56) References Cited

U.S. PATENT DOCUMENTS

| | | | |
|---|---|---|---|
| 7,075,540 B2 | 7/2006 | Yuasa | |
| 7,130,792 B2 | 10/2006 | Tokieda et al. | |
| 7,516,154 B2* | 4/2009 | Chan | G06Q 30/02 |
| 8,160,865 B1* | 4/2012 | Coughlan | G06F 17/248 |
| | | | 704/4 |
| 2001/0019326 A1 | 9/2001 | Yuasa | |
| 2002/0174025 A1 | 11/2002 | Hind et al. | |
| 2002/0193983 A1 | 12/2002 | Tokieda et al. | |
| 2003/0028366 A1* | 2/2003 | Redpath | G06F 17/2872 |
| | | | 704/3 |
| 2004/0030542 A1* | 2/2004 | Fuji | G06F 17/2836 |
| | | | 704/2 |
| 2005/0010419 A1* | 1/2005 | Pourhamid | G06Q 30/02 |
| | | | 704/277 |
| 2006/0217960 A1* | 9/2006 | Kato | G06F 17/289 |
| | | | 704/2 |
| 2009/0024595 A1* | 1/2009 | Chen | G06F 17/30864 |
| 2010/0094710 A1 | 4/2010 | Ramakrishna | |
| 2011/0208822 A1 | 8/2011 | Rathod | |
| 2011/0238495 A1 | 9/2011 | Kang | |
| 2012/0271828 A1* | 10/2012 | Raghunath | G06F 17/2818 |
| | | | 707/739 |
| 2014/0006004 A1* | 1/2014 | Gundepuneni | G06F 17/2264 |
| | | | 704/2 |
| 2014/0288946 A1* | 9/2014 | Shinohara | G06Q 30/0241 |
| | | | 705/2 |

FOREIGN PATENT DOCUMENTS

| | | |
|---|---|---|
| JP | 2002-311983 A | 10/2002 |
| JP | 2004-341965 A | 12/2004 |
| JP | 2005-204169 A | 7/2005 |
| JP | 3979621 B2 | 9/2007 |
| JP | 2010-170303 A | 8/2010 |
| JP | 4869311 B2 | 2/2012 |
| JP | 2012-159969 A | 8/2012 |
| JP | 2012-185654 A | 9/2012 |
| WO | 2009/015017 A1 | 1/2009 |

\* cited by examiner

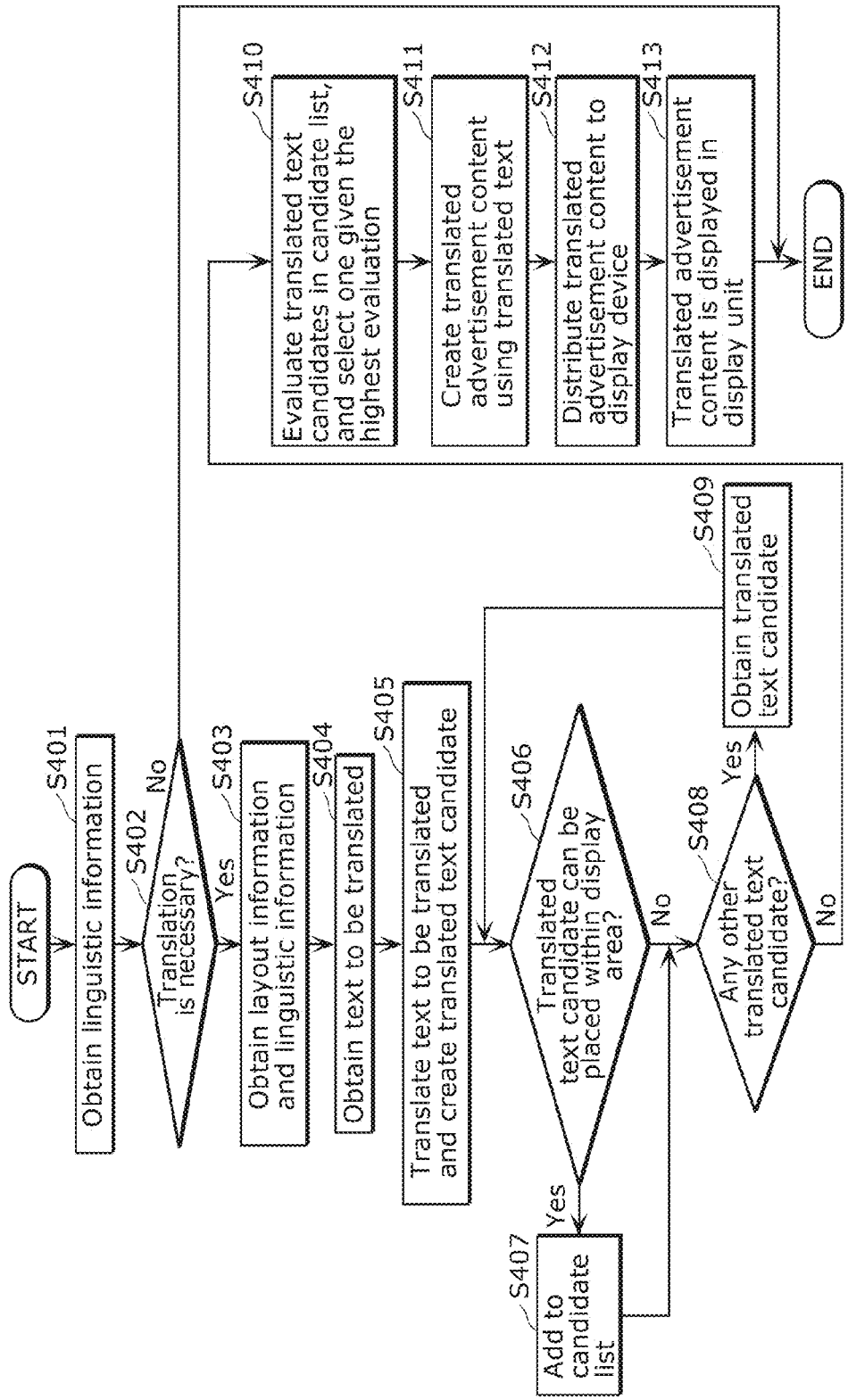

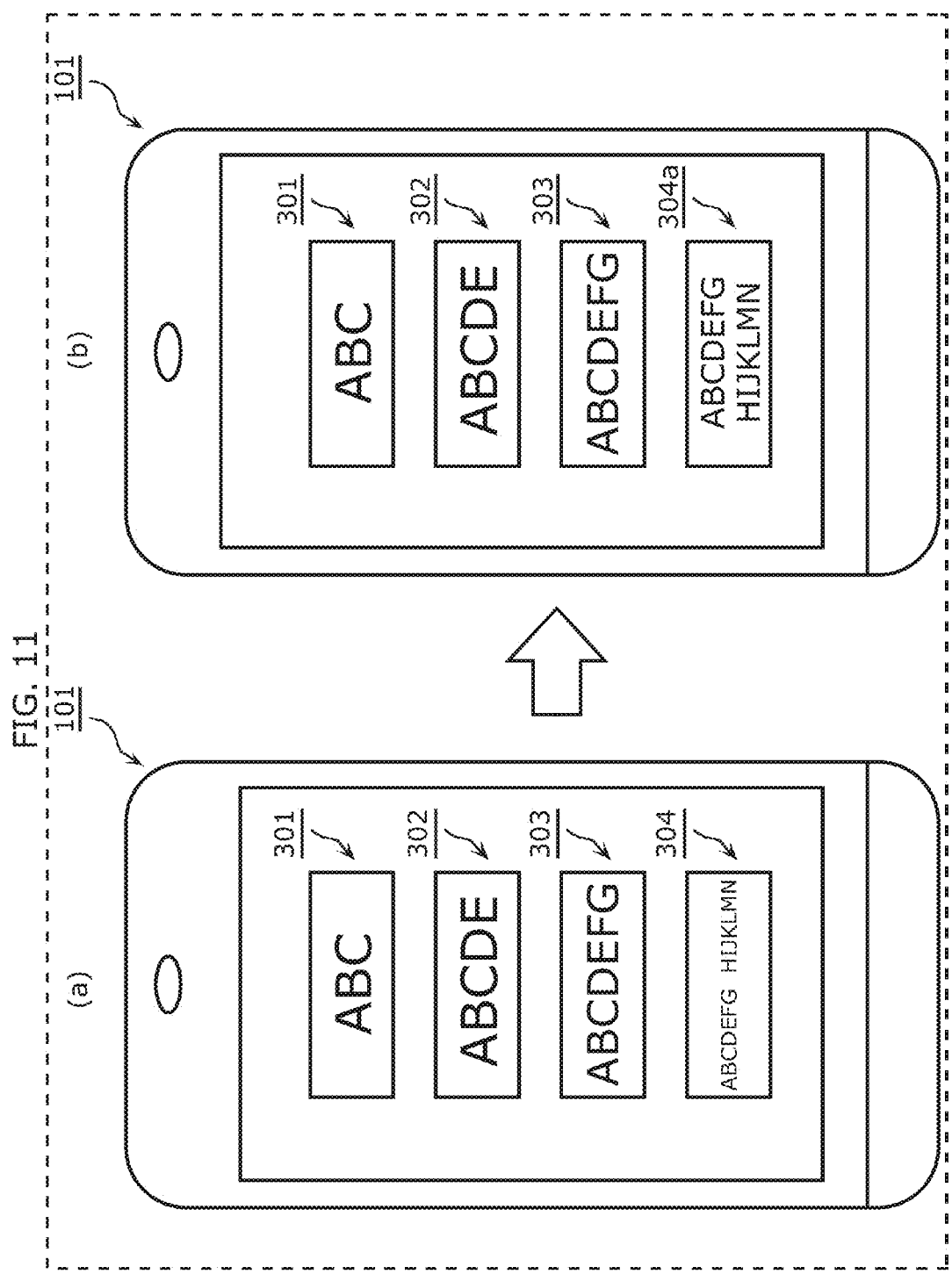

ADVERTISEMENT TRANSLATION DEVICE, ADVERTISEMENT DISPLAY DEVICE, AND METHOD FOR TRANSLATING AN ADVERTISEMENT

CROSS REFERENCE TO RELATED APPLICATION(S)

This is a continuation application of PCT International Application No. PCT/JP2013/004502 filed on Jul. 24, 2013, designating the United States of America, which is based on and claims priority of Japanese Patent Application No. 2013-059531 filed on Mar. 22, 2013. The entire disclosures of the above-identified applications, including the specifications, drawings and claims are incorporated herein by reference in their entirety.

FIELD

The present disclosure relates to an advertisement translation device for translating and displaying an advertisement text, an advertisement display device, and a method and a program for translating an advertisement.

BACKGROUND

The digital signage technology has been known as a technology used in the advertisement display device for displaying advertisement content in a shop.

For example, shops in areas gathering many foreign visitors have desires to easily translate advertisement content into another language and display the translated advertisement content in their shops.

SUMMARY

However, in advertisement content, the layout of an image and an advertisement text (words) is often predetermined. Therefore, in simple replacement of texts, a translated advertisement text, for example, lies off an original layout. This spoils the design of the advertisement content, and advertisement effects may decrease.

The present disclosure provides the advertisement translation device and others capable of displaying a translated advertisement text according to a layout without spoiling the design of advertisement content.

An advertisement translation device according to the present disclosure is the advertisement translation device for translating an advertisement text displayed in a display area of a predetermined size in advertisement content, and displaying the translated advertisement text in the display area. The advertisement translation device includes: an advertisement text obtainment unit which obtains the advertisement text; a linguistic information obtainment unit which obtains linguistic information indicating a target language into which the advertisement text is to be translated; a translation unit which creates translated text candidates by translating the advertisement text obtained by the advertisement text obtainment unit into the target language indicated by the linguistic information obtained by the linguistic information obtainment unit; and a selection unit which selects and outputs as a translated text, at least one of the translated text candidates a full text of which is displayable in a predetermined character size in the display area.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 10 is a second flowchart showing the operation of an advertisement translation system.

FIG. 11 is a figure showing an example of a translated text candidate to be displayed by a display unit of an input device.

DESCRIPTION OF EMBODIMENT(S)

(Underlying Knowledge Forming Basis of the Present Disclosure)

As described above, in advertisement content, the layout of an image and an advertisement text is predetermined. Therefore, the simple replacement of texts may spoil the design of the advertisement content, and the advertisement effects may decrease.

Here, there is an advertisement multilingual information provision system which, in a website creation, extracts linguistic information from a webpage and provides the translations in multiple languages of the webpage based on the extracted language information (e.g., Patent Literature 1 ("Japanese Patent No. 3,979,621"). In the technology disclosed in Patent Literature 1, the maximum number of words is set for text data using the smallest readable font for each language, and when a sentence translated based on this setting is too long to fit in a display space, the sentence is edited manually.

Such technology is unsuitable for advertisement content. For example, for advertisement content which would be frequently updated, such as special of the day in a restaurant, it takes time to create multilingual content every time the advertisement content is updated.

Moreover, since the length of a text differs depending on a target language into which the text is to be translated, a problem in such technology is in that the adjustment in each language is intricate. Therefore, it is practically difficult to apply the technology disclosed in Patent Literature 1 to the field of digital signage unless a target language into which a text is to be translated is identified beforehand.

The present disclosure solves the above problem, and provides the advertisement translation device and others capable of displaying a translated advertisement text according to a layout without spoiling the design of advertisement content. Moreover, the advertisement translation device and others according to the present disclosure can translate into multiple languages, and display translated advertisement content in a relatively short period of time.

The following details embodiments with reference to the drawings. It should be noted that unnecessarily detailed description may be omitted. For example, detailed description about a well-known matter and overlapping description for substantially the same configuration may be omitted. This is to avoid unnecessarily long description and facilitate the understanding of those skilled in the art.

It should be noted that the applicant provides the appended drawings and the following description for clear understanding of those skilled in the art. However, the applicant has no intention to limit the subject matter of Claims by these.

Embodiment 1

<Summary>

The following describes an advertisement translation system according to Embodiment 1.

Figure 1:
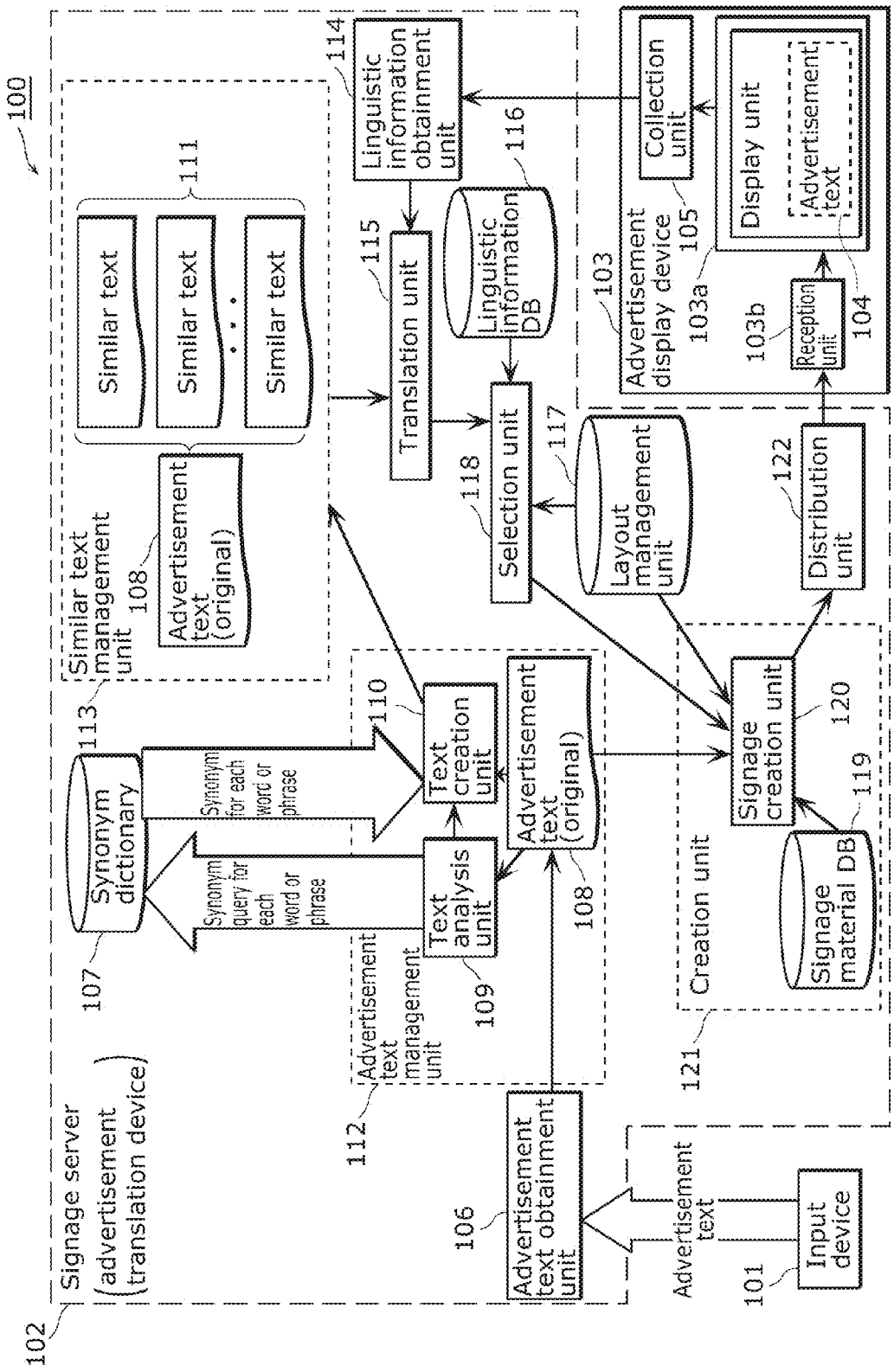
FIG. 1 is a block diagram showing the configuration of an advertisement translation system according to Embodiment 1.

FIG. 1 is a block diagram showing the configuration of the advertisement translation system.

An advertisement translation system 100 includes an input device 101, a signage server 102 (advertisement translation device), and an advertisement display device 103.

The input device 101 is a device to which a shop employee inputs an advertisement text or a product image, for example. That is, the input device 101 is a device by which the shop employee creates advertisement content.

Specifically, the input device 101 is a terminal device such as a cellular phone, a smart phone, a tablet, a personal computer, and a fax. The input device 101 can communicate via a network with the signage server 102 on the Internet. The input device 101 transmits to the signage server 102, an advertisement text inputted by the shop employee and a product image taken and inputted by the shop employee.

The signage server 102 receives the advertisement text and others inputted to the input device 101 from the input device 101, and creates and translates advertisement content.

The signage server 102 is a server on the Internet, and can communicate with each of the input device 101 and the advertisement display device 103. The signage server 102 creates advertisement content by allocating the advertisement text and the product image received from the input device 101 according to prepared templates, and translates and distributes to the advertisement display device 103. One of the templates is selected by the shop employee through the input device 101. It should be noted that the advertisement content translated by the signage server 102 is hereinafter simply referred to as translated advertisement content.

The signage server 102 can update the translated advertisement content even after the translated advertisement content is distributed to the advertisement display device 103.

Specifically, the signage server 102 can (i) receive from the input device 101, update instruction for a particular advertisement text or product image in the advertisement content, (ii) update the advertisement content, (iii) translate the updated advertisement content, and (iv) distribute to the advertisement display device 103. This allows the advertisement display device 103 to display translated advertisement content which has been updated. Thus, the signage server 102 can deal with the update of frequently updated advertisement content such as special of the day in a restaurant.

The advertisement display device 103 displays the advertisement content translated by the signage server 102. The advertisement display device 103 can communicate via the network with the signage server 102 on the Internet.

The advertisement display device 103 includes a display unit 103a, a reception unit 103b, and a collection unit 105.

The reception unit 103b receives translated advertisement content distributed by a distribution unit 122 of the signage server 102.

The display unit 103a displays the advertisement content translated by the signage server 102. Specifically, the display unit 103a displays the translated advertisement content received by the reception unit 103b. The display unit 103a, for example, includes a liquid crystal display and an organic electro-luminescence (EL) display. It should be noted that the advertisement content displayed by the display unit 103a includes a display area 104 which displays an advertisement text. The display area 104 is part of advertisement content.

The collection unit 105 collects information (linguistic information) on the native language of a viewer viewing the advertisement content displayed in the advertisement display device 103. That is, the collection unit 105 collects the linguistic information from the viewer (user), and transmits the collected linguistic information to a linguistic information obtainment unit 114 of the signage server 102. That is, the collection unit 105 causes the linguistic information obtainment unit 114 to obtain the linguistic information collected from the viewer.

The advertisement display device 103 applies a program (signage display program) for displaying translated advertisement content which the signage server 102 distributes to a large-sized monitor device, a television receiver, or the like which has a network connection function.

In this case, the signage display program is applied from the signage server 102 to the large-sized monitor device and the television receiver via the network. Moreover, the signage display program may be applied to the large-sized monitor device and the television receiver via a removable recording medium (such as a SD memory card (registered trademark)).

Moreover, the advertisement display device 103 may be achieved in the following aspect. It should be noted that the "display device" in the following description includes a monitor device and a television receiver.

The advertisement display device 103 may be achieved as a display device with a built-in browser. In this case, the signage server 102 distributes translated advertisement content to the advertisement display device 103 in a form in which the translated advertisement content can be played back by the browser. The advertisement display device 103 plays back the translated advertisement content received from the signage server 102, using the browser. The translated advertisement content in this case includes data in a hyper text markup language (HTML) form including a video such as Flash (registered trademark).

Moreover, the advertisement display device 103 may be achieved by including a display device and an external BOX (information processing device) connected to the display device.

In this case, the external BOX has a communication function for receiving translated advertisement content and the function of executing a signage display program and outputting a video signal to the display device. In particular, the external BOX is a personal computer (PC). However, the external BOX is not limited to this, and may be a dedicated information processing device.

It should be noted that the external BOX may include the above collection unit 105. Moreover, the external BOX may have a built-in browser, generate, using the browser, a video signal corresponding to translated advertisement content received from the signage server 102, and output to the display device.

<Signage Server>

Here, the following further details the configuration of the signage server 102 with reference to FIG. 1.

The signage server 102 includes an advertisement text obtainment unit 106, the linguistic information obtainment unit 114, a translation unit 115, and a selection unit 118. Moreover, the signage server 102 includes a creation unit 121, the distribution unit 122, a synonym dictionary 107, an advertisement text management unit 112, a similar text management unit 113, a linguistic information DB 116, and a layout management unit 117.

It should be noted that in FIG. 1, the advertisement text management unit 112 and the similar text management unit 113 are constituent elements different from the translation unit 115. However, the advertisement text management unit 112 and the similar text management unit 113 may be included in the translation unit 115.

The signage server 102 is an advertisement translation device for translating an advertisement text displayed in the display area 104 having a predetermined size in the advertisement content, and displaying the translated advertisement text in the display area 104.

The advertisement text obtainment unit 106 obtains the advertisement text. This means that the advertisement text obtainment unit 106 receives the advertisement text which a shop employee inputted to the input device 101.

The synonym dictionary 107 stores the synonyms of general terms or special terms used in the type of business to which a shop belongs.

The advertisement text management unit 112 manages, as an original advertisement text 108, an advertisement text which the advertisement text obtainment unit 106 obtained (received) from the input device 101. The advertisement text management unit 112 includes a text analysis unit 109 and a text creation unit 110.

The text analysis unit 109 analyzes the original advertisement text 108 to extract phrases (words or clauses), and queries the synonym dictionary 107 to find synonyms for each of the extracted phrases.

As a result of the query by the text analysis unit 109, the text creation unit 110 obtains a synonym list for each phrase from the synonym dictionary 107, and creates based on the obtained synonym list, similar texts 111 which are different texts and have meanings similar to the meaning of the original advertisement text 108. Here, the similar texts 111 are written in the language used in the original advertisement text 108.

The similar text management unit 113 manages (retains) the original advertisement text 108 and the similar texts 111 corresponding to the original advertisement text 108 which are associated.

The linguistic information obtainment unit 114 obtains (receives) linguistic information collected by the collection unit 105 of the advertisement display device 103. The linguistic information is typically the native language of a viewer viewing advertisement content. That is, the linguistic information indicates a target language into which an advertisement text is to be translated.

The translation unit 115 translates the original advertisement text 108 and the similar texts 111 which are managed by the similar text management unit 113 into the language indicated by the linguistic information obtained by the linguistic information obtainment unit 114. It should be noted that in the following description, translated texts (the translated original advertisement text 108 and the translated similar texts 111) are translated text candidates.

That is, the translation unit 115 creates the translated text candidates by translating the advertisement texts obtained by the advertisement text obtainment unit 106 into the language indicated by linguistic information obtained by the linguistic information obtainment unit 114.

The linguistic information DB 116 manages attribute information (e.g., read from left or right and line boundary character check) of each language which can be translated by the translation unit 115.

The layout management unit 117 manages layout information on the display area 104 in advertisement content (such as the position of the display area 104 in the advertisement content, the height and width of the display area 104, the smallest character size (predetermined character size), and a character font).

The selection unit 118 determines which one of translated text candidates is employed, based on (i) the translated text candidates obtained from the translation unit 115, (ii) the attribute information on a translated language managed by the linguistic information DB 116, and (iii) the layout information managed by the layout management unit 117. In the following description, a translated text candidate employed by the selection unit 118 is referred to as a translated text.

That is, the selection unit 118 selects from among the translated text candidates, one of translated text candidates the full texts of which are displayable in a predetermined character size in the display area 104, and outputs to the creation unit 121.

The creation unit 121 creates translated advertisement content by displaying a translated text outputted by the selection unit 118 in the display area in advertisement content. The creation unit 121 includes a signage creation unit 120 and a signage material DB 119.

The signage material DB 119 manages materials such as an image, a video, a sound, an advertisement text, and a fixed text (text which is not to be updated) making up advertisement content. These materials include materials which the advertisement text obtainment unit 106 received from the input device 101 and materials prepared to make up a template of the advertisement content.

The signage creation unit 120 creates translated advertisement content to be displayed in the advertisement display device 103, using layout information obtained from the layout management unit 117, materials managed by the signage material DB 119, and a translated text selected by the selection unit 118.

The distribution unit 122 distributes the translated advertisement content to the advertisement display device 103.

<Example 1 of Advertisement Content>

Figure 2:
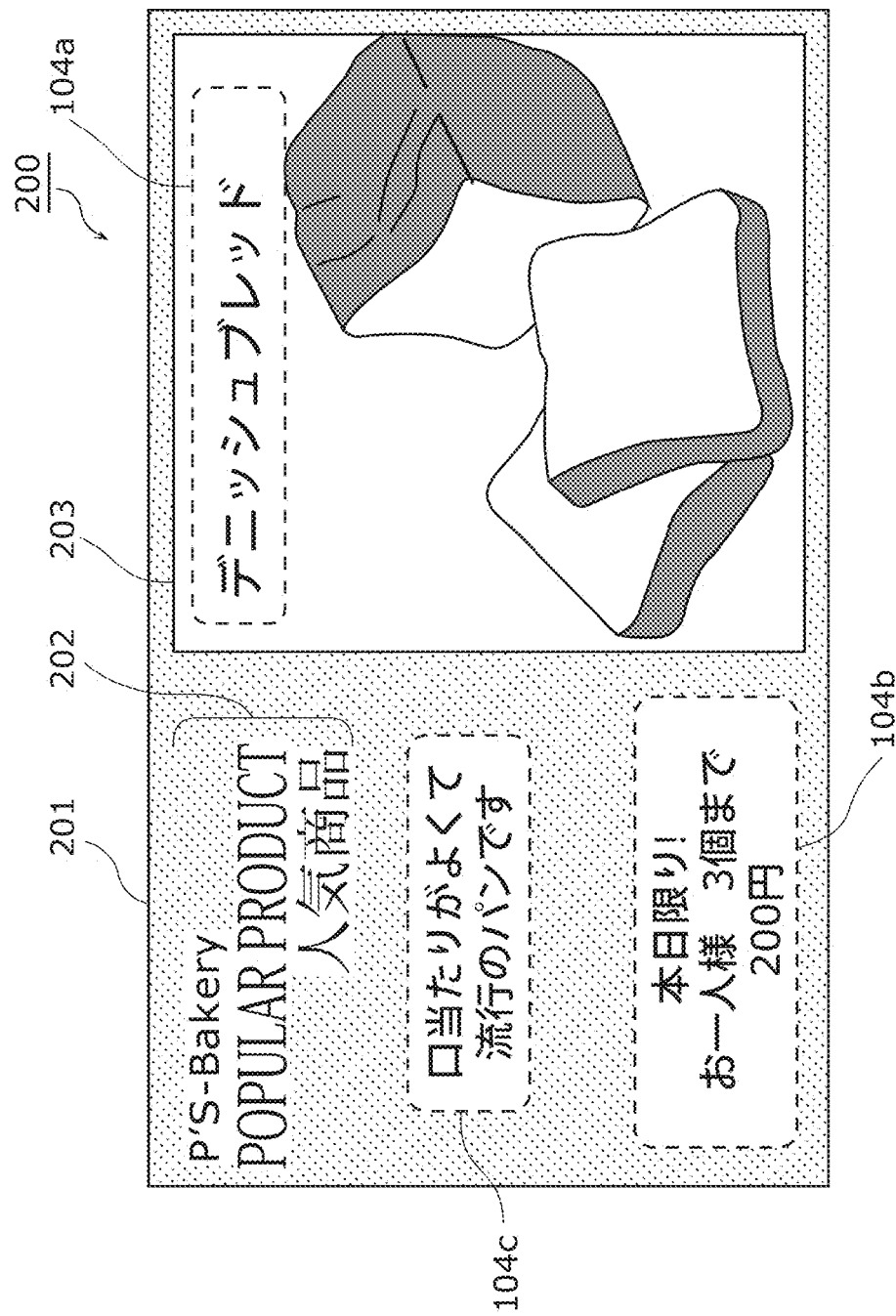
FIG. 2 is a figure for explaining advertisement content.

The following describes advertisement content displayed by the advertisement display device 103 with reference to FIG. 2.

FIG. 2 is a figure for explaining the advertisement content. It should be noted that all the texts except a fixed text are written in Japanese in FIG. 2.

An advertisement content 200 includes a material (background) 201 managed by the signage material DB 119, a material (fixed text) 202, a material (image) 203, three display areas: display areas 104a, 104b, and 104c in each of which an advertisement text inputted by a shop employee is displayed. The size and position of each of the materials and the display areas 104 are defined by layout information managed by the layout management unit 117. It should be noted that broken-line frames showing the three display areas 104a, 104b, and 104c are not shown in reality.

Here, the following describes an example in which an advertisement text displayed in the display area 104c is converted into a translated text. It should be noted that the following example describes an example in which an advertisement text written in Japanese is converted into a translated text written in English.

Figure 3:
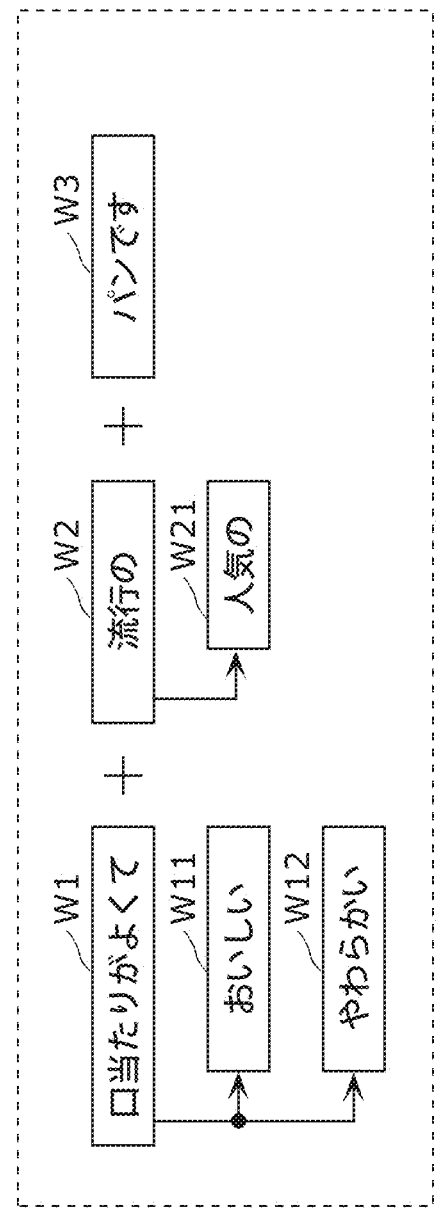
FIG. 3 is a first figure for explaining an example in which an advertisement text shown in FIG. 2 is converted into a translated text.
Figure 4:
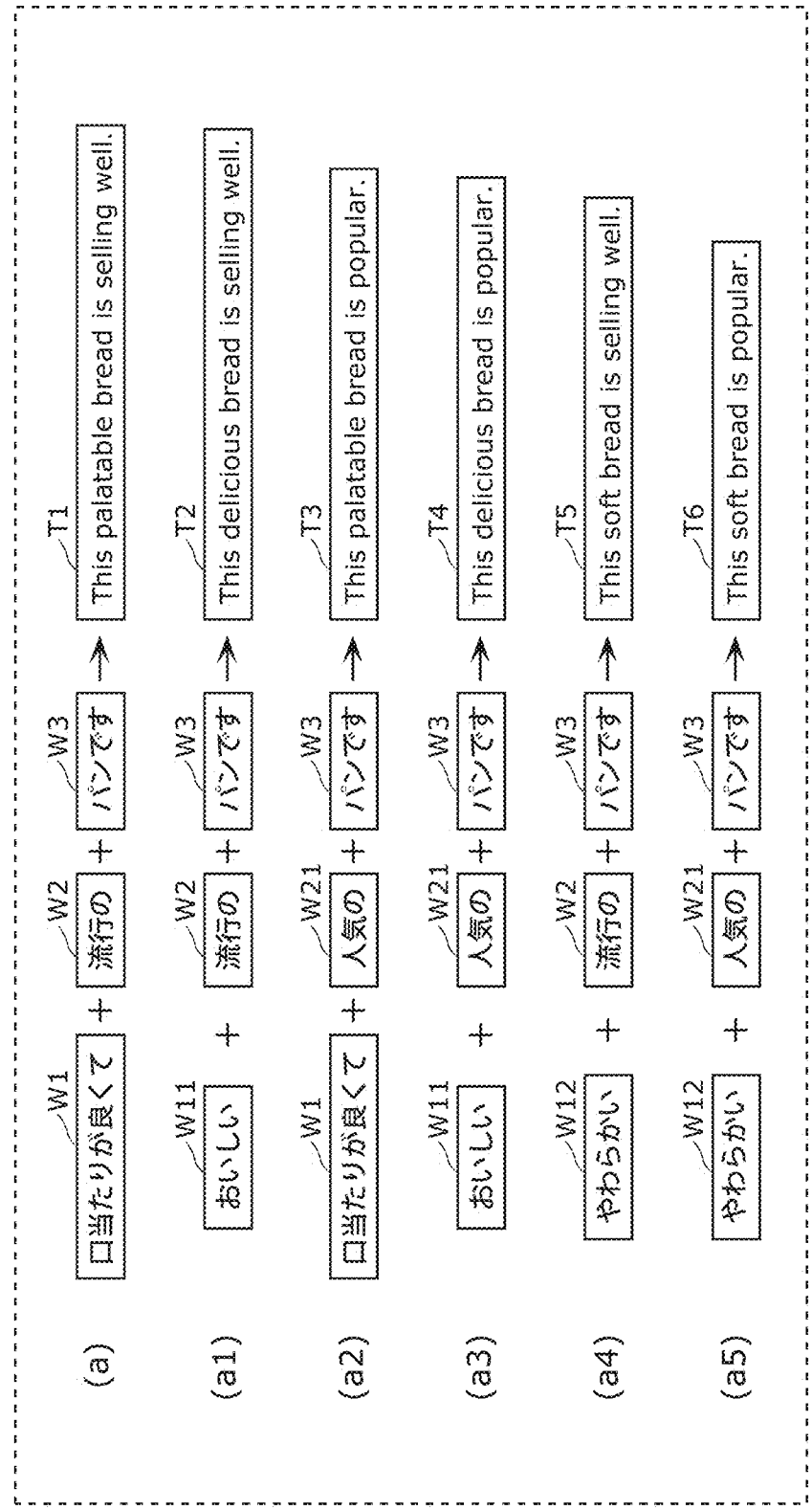
FIG. 4 is a second figure for explaining an example in which an advertisement text shown in FIG. 2 is converted into a translated text.

FIGS. 3 and 4 are figures for explaining an example in which an advertisement text in FIG. 2 is converted into a translated text.

The advertisement text displayed in the display area 104c is divided into three words (clauses): a word W1, a word W2, and a word W3 by the text analysis unit 109. It should be noted that the words W1 and W2 are adjective, while the word W3 includes a noun and a verb.

Here, the text analysis unit 109 queries the synonym dictionary 107 to find synonyms of each of the words W1, W2, and W3. As a result, the text creation unit 110 obtains words W11 and W12 as the synonyms of the word W1. Moreover, the text creation unit 110 obtains a word W21 as the synonym of the word W2. Here, a synonym cannot be obtained in some cases as with the word W3.

As shown in FIG. 4, the text creation unit 110 creates five similar texts 111 by combining these synonyms. This means that the text creation unit 110 creates similar texts 111 by performing replacement processing in which at least one word in the advertisement text is replaced by a synonym.

(a) in FIG. 4 shows the original advertisement text. The translation unit 115 translates this text, and creates a translated text candidate T1.

(a1) to (a5) in FIG. 4 respectively show the similar texts 111 which combine one of the words W1, W11, and W12, one of the words W2 and W21, and the word W3. Translated text candidates created by the translation unit 115 translating the similar texts 111 shown in (a1) to (a5) in FIG. 4 are respectively translated text candidates T2 to T6.

Thus, the translation unit 115 creates the similar texts 111 by, using the text analysis unit 109 and the text creation unit 110, performing on an advertisement text, replacement processing in which at least one word in the advertisement text is replaced by a synonym in the language used in the advertisement text. Furthermore, the translation unit 115 translates each of the created similar texts 111 and the advertisement text into a language indicated by linguistic information to create translated text candidates.

Here, the selection unit 118 selects, from among the translated text candidates T1 to T6, translated text candidates the full texts of which can be displayed in a predetermined character size in the display area 104c, based on the layout information managed by the layout management unit 117.

In the example shown in FIG. 4, the full texts of the translated text candidates T1 to T3 cannot be displayed in the predetermined character size in the display area 104c. That is, the full texts of two or more of the translated text candidates created by the translation unit 115 cannot be displayed in the predetermined character size in the display area 104c, while the full texts of the other translated text candidates can be displayed in the predetermined character size in the display area 104c. Therefore, the selection unit 118 selects the translated text candidates T4 to T6.

Here, the selection unit 118, for example, selects the translated text candidate T6 having the smallest number of characters from among the translated text candidates the full texts of which can be displayed in the predetermined character size in the display area 104c, and outputs to the creation unit 121.

The creation unit 121 creates translated advertisement content by displaying the translated text T6 outputted by the selection unit 118 in the display area 104c in the advertisement content 200. That is, the creation unit 121 creates translated advertisement content by replacing the advertisement text with the translated text T6 in the display area 104c in the advertisement content 200. The translated advertisement content created is displayed in the display unit 103a.

Figure 5:
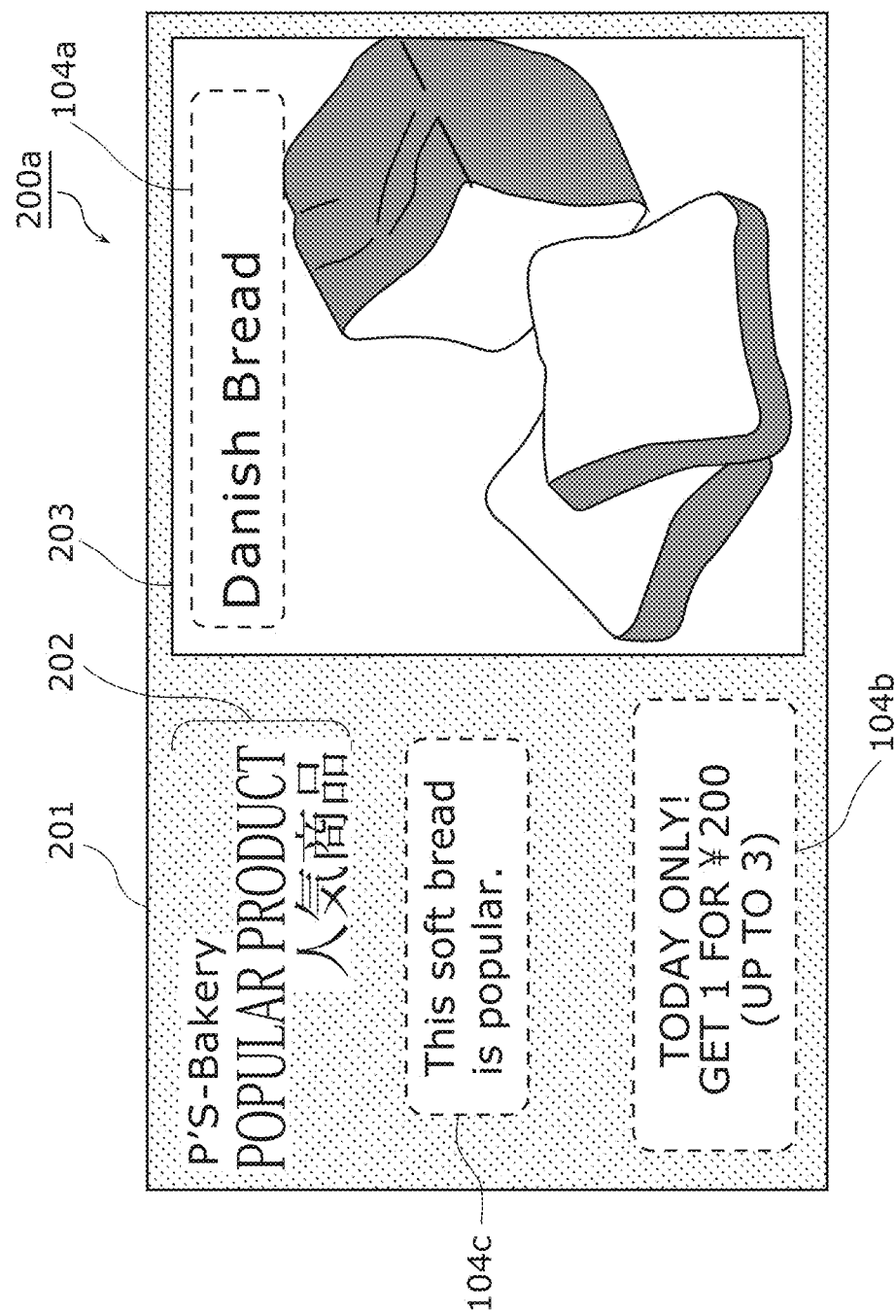
FIG. 5 shows translated advertisement content obtained by translating advertisement content shown in FIG. 2.

FIG. 5 shows translated advertisement content obtained by translating the advertisement content 200 shown in FIG. 2.

As shown in FIG. 5, in translated advertisement content 200a, the translated text T6 is displayed in the display area 104c. It should be noted that translated texts are also displayed in the display areas 104a and 104b.

Thus, the signage server 102 selects an appropriate translated text candidate according to the size of the display area 104c. That is, the signage server 102 can cause the advertisement display device 103 to display a translated advertisement text according to a layout without spoiling the design of the advertisement content.

It should be noted that the case where none of the full texts of the translated text candidates can be displayed in a predetermined character size in the display area 104c can be assumed. In this case, the selection unit 118, for example, selects a translated text candidate having the smallest number of characters as a translated text from among the translated text candidates, and outputs to the creation unit 121. The creation unit 121 reduces the character size of the translated text such that the full text of the translated text outputted by the selection unit 118 can be displayed in the display area 104c. The creation unit 121 creates translated advertisement content by displaying the translated text of a reduced size in the display area 104c.

Thus, when none of the full texts of the translated text candidates can be displayed in a predetermined character size in the display area 104c, translated content displaying a translated text whose character size has been reduced is created.

It should be noted that FIG. 2 is an example of advertisement content. The advertisement content may include a material such as a video or a sound, and include more than one for each material. Moreover, the layout of each material is not limited to the layout shown in FIG. 2, or each material and the number, the position, the number of characters, and others of an advertisement text inputted by a shop employee are not limited to the configuration shown in FIG. 2. Furthermore, the advertisement content in FIG. 2 is not used to limit target shops to bakeries. Any shops which provide customers with products or a service may be covered by the advertisement translation system 100.

<Example 2 of Advertisement Content>

Figure 6:
FIG. 6 is a figure for explaining another example of the advertisement content.

The following describes another example of the advertisement content displayed by the advertisement display device 103 with reference to FIG. 6.

FIG. 6 is a figure for explaining another example of the advertisement content.

Advertisement content 300 shown in FIG. 6 includes a display area 104*d* and a display area 104*e* as the display areas of advertisement texts. It should be noted that the broken line frames showing the display area 104*d* and the display area 104*e* are not displayed in reality.

The following describes an example in which the advertisement text displayed in the display area 104*e* in FIG. 6 is converted into a translated text.

Figure 7:
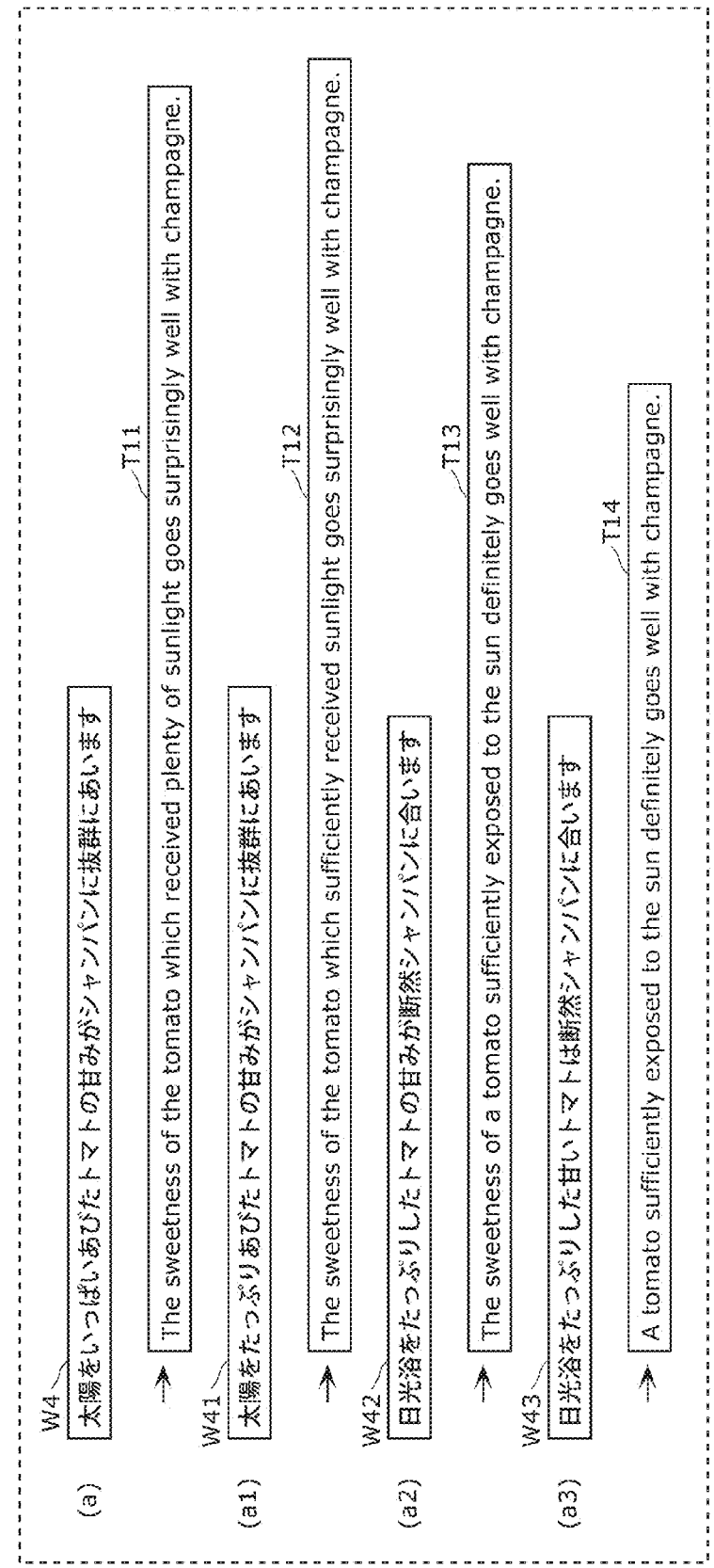
FIG. 7 is a figure for explaining an example in which an advertisement text shown in FIG. 6 is converted into a translated text.

FIG. 7 is a figure for explaining an example in which advertisement texts shown in FIG. 6 are converted into translated texts.

As shown in FIG. 7, the text creation unit 110 creates three similar texts 111 by combining these synonyms. This means that the text creation unit 110 creates the similar texts 111 by performing replacement processing in which at least one word in an advertisement text is replaced by a synonym.

An advertisement text W4 shown in (a) in FIG. 7 is the original advertisement text. The translation unit 115 translates the text to create a translated text candidate T11.

In the example in FIG. 7, the text creation unit 110 creates similar texts by combining three steps. In the first step, a word is replaced by a synonym as described above.

In the second step, the configuration "noun+noun" is converted into the configuration "adjective+noun". According to this step, "sweetness of the tomato" is converted into "the sweet tomato".

In the third step, a "noun" is converted into a "sentence". According to this step, "sunbathing" is converted into "A body receives sunlight".

As shown in (a1) to (a3) in FIG. 7, the text creation unit 110 creates similar texts W41 to W43 from the advertisement text W4 by combining these steps. It should be noted that the similar texts W41 to W43 shown in (a1) to (a3) in FIG. 7 are similar texts written in Japanese and obtained by converting the advertisement text W4 written in Japanese using the above rules (the three steps).

Moreover, as shown in (a) and (a1) to (a3) in FIG. 7, translated text candidates T11 to T14 are respectively created by the translation unit 115 translating the advertisement text W4 and the similar texts W41 to W43.

Here, the selection unit 118 selects as a translated text from among the translated text candidates T11 to T14, the translated text candidate T14 having the smallest number of characters among translated text candidates the full texts of which can be displayed in a predetermined character size in the display area 104*c*, based on the layout information managed by the layout management unit 117, and outputs to the creation unit 121.

Figure 8:
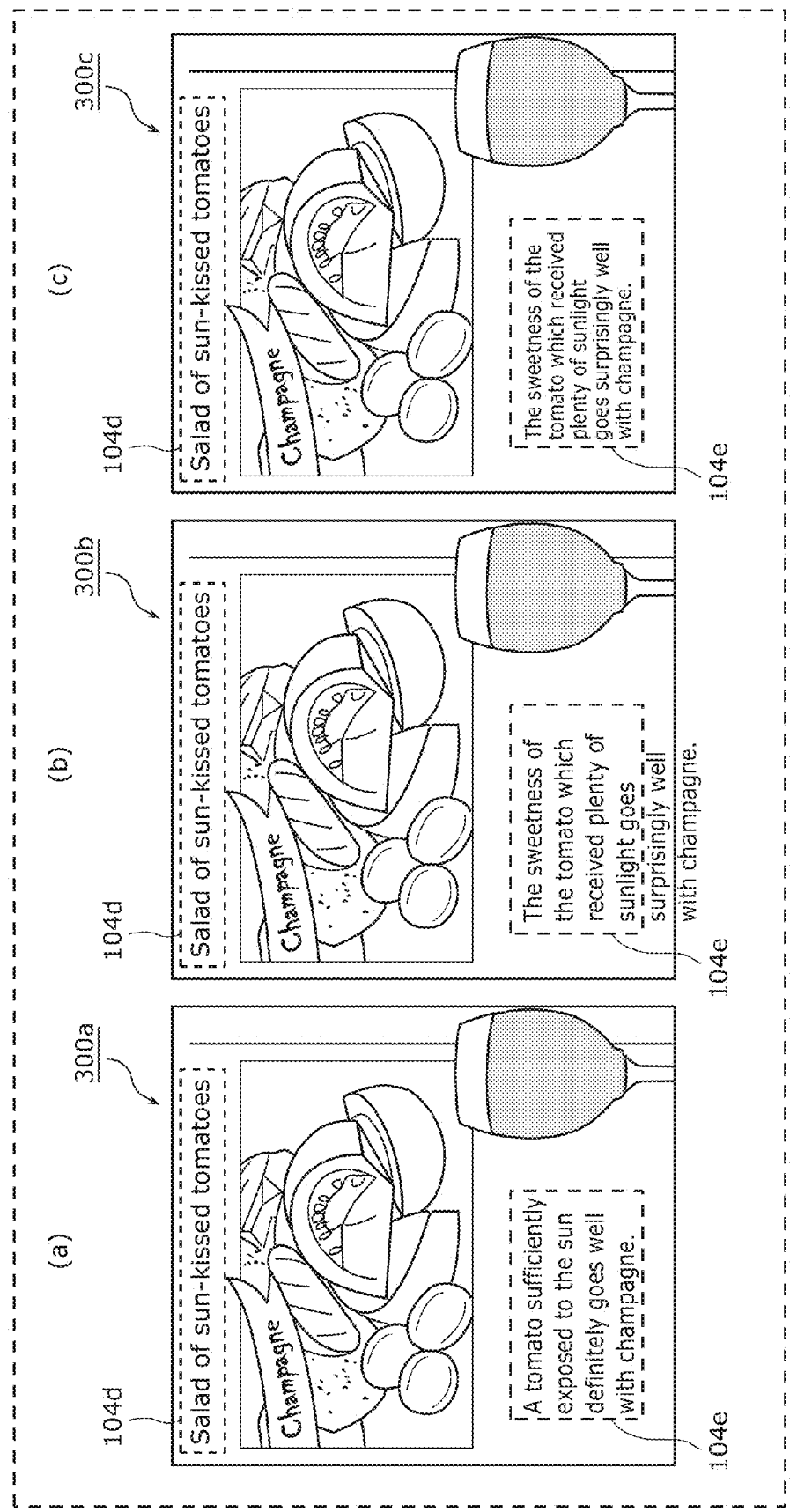
FIG. 8 shows translated advertisement content obtained by translating the advertisement content shown in FIG. 6.

FIG. 8 shows translated advertisement content obtained by translating the advertisement content 300 shown in FIG. 6.

As shown in (a) in FIG. 8, in translated advertisement content 300*a*, the translated text T14 is displayed in the display area 104*e*. It should be noted that a translated text is also displayed in the display area 104*d*.

Thus, the signage server 102 preferentially selects the translated text candidate T14 which can be placed within the display area 104*e*, rather than the translated text candidate T11 more faithful to the original advertisement text 108. This is a point different from a normal translation device.

If the selection unit 118 selects the translated text candidate T11 more faithful to the original text as the translated text, some words are out of the display area 104*e* as shown in (b) in FIG. 8. This spoils the design of translated advertisement content 300*b*.

Here, as with translated advertisement content 300*c* shown in (c) in FIG. 8, the translated text candidate T11 may be placed within the display area 104*e* by reducing the character size of the translated text candidate T11. However, in advertisement content, reduction in character size is not preferable in terms of advertising effects since it is more difficult to attract viewer's attention.

Meanwhile, the signage server 102 can create translated advertisement content which maintains designability and the advertising effects as shown in (a) in FIG. 8.

It should be noted that in the example in FIG. 7, the advertisement text W4 and the similar texts 41 to W43 correspond to the translated text candidates T11 to T14, respectively. However, translated text candidates can be created from one of the advertisement text W4 and the similar texts W41 to W43 by the translation unit 115 translating one of the advertisement text W4 and the similar texts W41 to W43, using various kinds of translation applications. That is, one-to-one correspondence between the advertisement text W4 and the similar texts 41 to W43 and the translated text candidates T11 to T14 does not have to be established.

<Summary of Operation>

Figure 9:
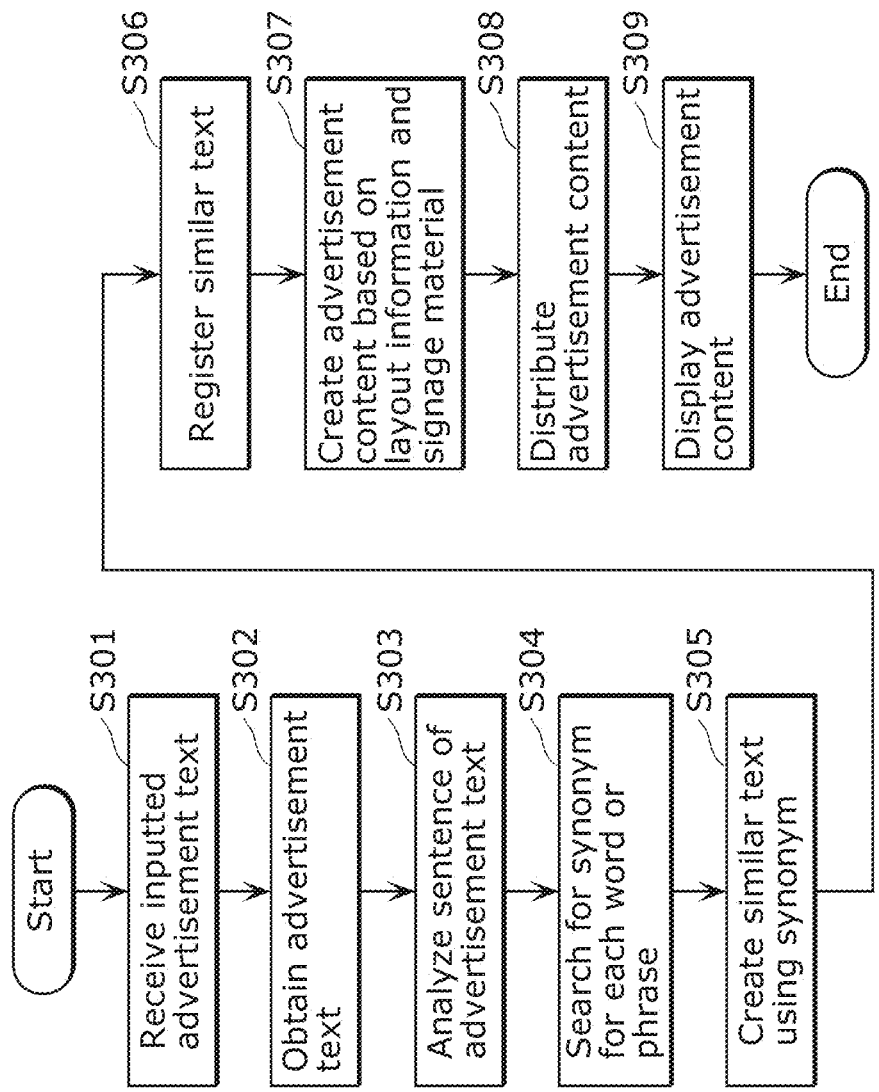
FIG. 9 is a first flowchart showing the operation of an advertisement translation system.

With reference to FIG. 9, the following describes procedure from when a shop employee registers an advertisement text in the signage server 102 through the input device 101 to when advertisement content is displayed in the display unit 103*a* in the advertisement display device 103.

FIG. 9 is a flowchart showing the operation of the advertisement translation system 100. It should be noted that the flowchart shown in FIG. 9 is a flowchart when advertisement content prior to translation is displayed.

The input device 101 receives input such as an advertisement text from the shop employee, and transmits to the signage server 102 (S301). As long as the input device 101 can receive input of character information from the shop employee, and transmit the character information to the signage server 102, the input device 101 is not limited to a particular device. The input device 101 may be, for example, a cellular phone, a smart phone, a tablet, a personal computer, or a fax.

The advertisement text obtainment unit 106 obtains (receives) the advertisement text inputted in step S301, and registers in the advertisement text management unit 112 as the original advertisement text 108 (S302).

The text analysis unit 109 in the advertisement text management unit 112 analyzes the registered original advertisement text 108, and extracts phrases from the original advertisement text 108 such that the synonym dictionary 107 can be searched for synonyms (S303). The text analysis unit 109, for example, extracts each word, extracts each clause, and analyzes word attributes.

The text analysis unit 109 in the advertisement text management unit 112 searches the synonym dictionary 107 for synonyms for each word or each clause, using the extracted phrases extracted in step S303 (S304). It should be noted that the synonym dictionary 107 is provided in the signage server 102 in Embodiment 1. However, the text analysis unit 109 may use other synonym dictionary (DB) on the Internet.

The text creation unit 110 in the advertisement text management unit 112 creates the similar texts 111 similar to the original advertisement text 108 (S305). Specifically, the text creation unit 110 creates the similar texts 111 similar to the original advertisement text 108 using the original advertisement text 108, an analysis result obtained by the text analysis unit 109, and synonyms obtained by searching the synonym dictionary 107.

The text creation unit 110 in the advertisement text management unit 112 registers in the similar text management unit 113, the original advertisement text 108 registered in step S302 and the similar texts 111 created in step S305 (S306).

Here, the advertisement text management unit 112 transmits the original advertisement text 108 to the creation unit 121 to cause the advertisement display device 103 to display the advertisement text inputted by the shop employee.

The creation unit 121 creates advertisement content using the original advertisement text 108, layout information managed by the layout management unit 117, and materials managed by the signage material DB 119 (S307). The creation unit 121 transmits the created advertisement content to the distribution unit 122.

The distribution unit 122 distributes the advertisement content to the advertisement display device 103 (S308).

The advertisement display device 103 receives the advertisement content from the signage server 102, and displays in the display unit 103a (S309).

In this way, the advertisement content including the advertisement text created in the native language of the shop employee is displayed in the display unit 103a in the advertisement display device 103. It should be noted that classification into the steps and the order of the steps in the flowchart in FIG. 9 are examples, and are not limited to such classification and order.

It should be noted that in step S306, similar texts are registered in the similar text management unit 113. However, this processing may be performed in translating an advertisement text. However, a merit for the pre-registering of similar texts in this way is in that translated text candidates can be created at an early stage when the linguistic information obtainment unit 114 obtains linguistic information.

<Identification of Native Language of Viewer>

The following describes an example of a method for collecting linguistic information by the collection unit 105 which collects information (linguistic information) on the native language of a viewer viewing advertisement content displayed in the display unit 103a in the advertisement display device 103.

Example 1

The collection unit 105 collects the linguistic information using the language setting information for an information communication terminal (e.g., portable terminal such as a smart phone and a cellular phone) of the viewer. Specifically, the collection unit collects the linguistic information through wireless communication with the information communication terminal of the viewer (user).

In this case, the collection unit 105 includes a short-distance wireless (such as a wireless LAN, Bluetooth (registered trademark), infrared transmission, or near field communication (NFC)) transmitter-receiver included in the information communication terminal of the viewer. The collection unit 105 identifies the native language of the viewer by collecting the language setting information for the information communication terminal of the viewer through wireless communication using the transmitter-receiver. It should be noted that in this case, a dedicated application should be preferably used for collecting the language setting information.

Example 2

The collection unit 105 uses the language which the viewer speaks. Specifically, the collection unit 105 collects the linguistic information by making the user speak a predetermined word or a predetermined phrase.

In this case, the advertisement display device 103 causes the display unit 103a to display a text in English and French which can be understood by a large population in the world, for asking the user to speak particular words. The text, for example, says "Please say "hello" in your mother tongue. English, French or any other language would be fine". The collection unit 105 includes a microphone, records words spoken by the viewer using the microphone, analyzes the words with a speech recognition application capable of recognizing multiple languages, and identifies the native language of the viewer. It should be noted that the speech recognition application capable of recognizing the multiple languages may be installed in the collection unit 105, or may be installed in the linguistic information obtainment unit 114 in the signage server 102.

Example 3

The collection unit 105 collects the linguistic information using a language selection menu displayed in the display unit 103a in the advertisement display device 103. Here, the advertisement display device 103 includes a touch panel, and displays the language selection menu in the display unit 103a. A viewer selects her/his native language by touching the language selection menu. It should be noted that the language selection menu may be implemented as the functions of the advertisement display device 103 and the collection unit 105, or may be practically implemented as the function of the signage server 102. This means that the advertisement display device 103 may request the signage server 102 to provide a language list which can be translated by the signage server 102, and display the language selection menu in the display unit 103a based on the obtained language list. Moreover, the language selection menu may be implemented as the function of advertisement content which the distribution unit 122 distributes to the advertisement display device 103.

<Localization to Native Language of Viewer>

With reference to FIG. 10, the following describes a method for displaying an advertisement text in the native language of a viewer viewing the advertisement in front of the advertisement display device 103.

FIG. 10 is a flowchart showing the operation of the advertisement translation system 100. It should be noted that the flowchart shown in FIG. 10 is a flowchart when translated content is displayed.

The linguistic information obtainment unit 114 obtains information (linguistic information) on the native language of the viewer from the collection unit 105, and identifies the native language of the viewer (S401).

Subsequently, the linguistic information obtainment unit 114 identifies whether the viewer is a foreigner or not from the identified native language. That is, whether or not the language indicated by the linguistic information matches the language of currently-displayed advertisement content (whether or not the advertisement text needs to be translated) is determined (S402).

When the language indicated by the linguistic information matches the language of the currently-displayed advertisement content, the signage server 102 does not have to change the language of the advertisement text. Therefore, the signage server 102 ends the processing. When the language indicated by the linguistic information does not match the language of the currently-displayed advertisement content, the linguistic information obtainment unit 114 notifies the translation unit 115 of the language indicated by the linguistic information, and instructs the selection unit 118 to select a translated text candidate.

The selection unit 118 obtains layout information from the layout management unit 117, and obtains the attribute information on the language indicated by the linguistic information (the native language of the viewer) from the linguistic information DB 116 (S403).

The translation unit 115 obtains texts to be translated (the original advertisement text 108 and the similar texts 111) from the similar text management unit 113 (S404).

The translation unit 115 translates the original advertisement text 108 and the similar texts 111 one by one using the language notified by the linguistic information obtainment unit 114 in step S402 to create translated text candidates (S405).

The selection unit 118 evaluates one by one whether or not the translated text candidates created by the translation unit 115 in step S405 are placed within the display area 104 specified by the layout information, using the layout information obtained from the layout management unit 117 and the attribute information on the language obtained from the linguistic information DB 116 (S406).

When a translated text candidate is placed within the display area 104 (Yes in S406), the selection unit 118 adds the translated text candidate to a text candidate list internally managed by the selection unit 118 (S407).

When the translated text candidate is not placed within the display area 104 (No in S406), the selection unit 118 queries the translation unit 115 as to whether or not there is other translated text candidate which should be evaluated (S408).

When there is a translated text candidate which should be evaluated (Yes in S408), the selection unit 118 obtains the new translated text candidate from the translation unit 115 (S409). Here, the processing goes back to step S406.

When there is no translated text candidate which should be evaluated (No in S408), the selection unit 118 evaluates translated text candidates in the text candidate list, selects the translated text candidate given the highest evaluation value, and transmits the translated text candidate selected (a translated text) to the creation unit 121 (S410). It should be noted that a method for evaluating translated text candidates will be detailed later.

The creation unit 121 creates translated advertisement content from the translated text candidate (the translated text) given the highest evaluation value obtained in step S410, layout information managed by the layout management unit 117, and materials managed by the signage material DB 119 (S411). The creation unit 121 transmits the translated advertisement content to the distribution unit 122 to cause the advertisement display device 103 to display the translated advertisement content created (S411).

The distribution unit 122 distributes the translated advertisement content obtained from the creation unit 121 to the advertisement display device 103 (S412).

The advertisement display device 103 receives the translated advertisement content distributed by the distribution unit 122, and displays in the display unit 103a (S413).

The above processing can provide a viewer viewing advertisement content displayed in the display unit 103a in the advertisement display device 103 with the translated advertisement content translated into the native language of the viewer. It should be noted that classification into the steps and the order of the steps in the flowchart in FIG. 10 are examples, and are not limited to such classification and order.

<Evaluation Method of Translated Text>

Here, the following describes an example of a method for evaluating a translated text candidate added to the text candidate list held by the selection unit 118 in step S410.

Example 1

The selection unit 118 evaluates based on how much the translated text candidate occupies the display area when a predetermined character size indicated by the layout information managed by the layout management unit 117 is used.

Specifically, the selection unit 118, for example, gives a higher evaluation for a translated text candidate that occupies an area more similar in size to the display area 104 (a translated text candidate having a higher occupancy in the display area 104) among translated text candidates displayed in the display area 104. That is, the selection unit 118 selects and outputs as a translated text from among translated text candidates the full texts of which can be displayed in a predetermined size in the display area 104, a translated text candidate that has the largest area among the translated text candidates displayed in the display area 104.

Thus, the selection unit 118 can select as a translated text, a translated text candidate which perfectly fits in the display area 104 when displayed. Therefore, the designability of translated advertisement content is improved.

Moreover, the selection unit 118 may, for example, give a higher evaluation for a translated text candidate that less occupies the display area 104 (a translated text candidate having a lower occupancy in the display area 104) among translated text candidates displayed in the display area 104. That is, the selection unit 118 may select and output as a translated text from among translated text candidates the full texts of which can be displayed in a predetermined size in the display area 104, a translated text candidate that has the smallest area among the translated text candidates displayed in the display area 104.

Thus, it is possible to select as a translated text, a translated text candidate which secures a space in the display area 104 and can be neatly displayed.

It should be noted that when the area of the translated text candidate in the display area 104 is determined, not only character size but also a space, a line feed, and the like should be taken into account.

Example 2

The selection unit 118 evaluates based on how similar the similar text 111, which is the original of a translated text candidate, is to the original advertisement text 108.

Specifically, the selection unit 118 compares the original advertisement text 108 with the similar text 111, which is original of the translated text candidate, and gives a higher evaluation for the translated text candidate created from the similar text 111 with an increase in the number of the same words. That is, the selection unit 118 selects and outputs as a translated text, a translated text candidate having the smallest number of words replaced by synonyms in word replacement processing performed when a similar text is created from the original advertisement text 108.

This allows the selection unit 118 to select as a translated text, a translated text candidate having a more similar meaning to the original advertisement text 108.

Moreover, the selection unit 118 may, for example, weight a particular word (e.g., a subject (noun), verb) or part of speech in the original advertisement text 108, and compare the original advertisement text 108 and the similar text 111, which is the original of the translated text candidate.

For example, the selection unit 118 gives a higher evaluation for the similar text 111 having the same subject and verb as the original advertisement text 108 than for the similar text 111 having the same adjective and adverb as the original advertisement text 108. The selection unit 118 gives a higher evaluation for a translated text candidate the original text of which, i.e., the similar text 111 is given a high evaluation.

That is, each of the words in the original advertisement text 108 may be weighted according to the part of speech of the word, and the selection unit 118 may select and output a translated text candidate as a translated text based on the sum of the weights of words replaced by synonyms in the replacement processing. For example, when greater weights are assigned to a noun and a verb and smaller weights are assigned to an adjective and an adverb, the selection unit 118 selects and outputs as a translated text, a translated text candidate having the smallest sum of the weights of words replaced by synonyms in the replacement processing.

This allows the selection unit 118 to select as a translated text, a translated text candidate having a more similar meaning to the original advertisement text 108

Example 3

When the maximum number of characters displayable in the display area 104 and the best number of characters are defined in the layout information managed by the layout management unit 117, the selection unit 118 may select a translated text based on the number of characters used in a translated text candidate.

For example, the selection unit 118 may select and output the translated text candidate which has the smallest number of characters as a translated text, from among translated text candidates the full texts of which can be displayed in a predetermined size in the display area 104.

Thus, it is possible to select as a translated text, a translated text candidate which secures a space in the display area 104 and can be neatly displayed.

For example, the selection unit 118 may select and output the translated text candidate which has the largest number of characters as a translated text, from among translated text candidates the full texts of which can be displayed in a predetermined size in the display area 104.

Thus, the selection unit 118 can select as a translated text, a translated text candidate which perfectly fits in the display area 104 when displayed. Therefore, the designability of translated advertisement content is improved.

Moreover, when the best number of characters (the predetermined number of characters) is defined, the selection unit 118 may select and output as a translated text, the translated text candidate which has the number of characters closest to the predetermined number of characters, from among translated text candidates the full texts of which can be displayed in a predetermined size in the display area 104.

It should be noted that the method for evaluating a translated text candidate added to the text candidate list is not limited to the above example, and the translated text candidate may be evaluated by other evaluation axis.

<Summary>

As described above, in the advertisement translation system 100 according to Embodiment 1, the signage server 102 identifies the native language of a viewer viewing advertisement content, and creates the similar texts 111 using the original advertisement text 108 and the synonym dictionary 107. Furthermore, the signage server 102 translates each of the similar texts 111 into the native language of the viewer to create translated text candidates, and selects as a translated text, the most preferable translated text candidate from among the translated text candidates created. The advertisement display device 103 displays translated advertisement content displaying the translated text in the display area 104.

The signage server 102 can create in a short period of time the translated advertisement content which can be displayed in a language indicated by the linguistic information, by pre-registering similar texts. The viewer can automatically create a translated advertisement text according to the size of the display area 104.

Embodiment 2

In Embodiment 1, the selection unit 118 selects as a translated text, a translated text candidate which can be placed within the display area 104. However, the method of selecting a translated text candidate by the selection unit 118 is not limited to such method.

Embodiment 2 describes the example in which a shop employee (advertiser) selects a translated text candidate.

The configuration of an advertisement translation system according to Embodiment 2 is almost the same as that of the advertisement translation system 100 shown in FIG. 1. Moreover, the method of creating a translated text candidate is similar to the method described in Embodiment 1.

In the advertisement translation system according to Embodiment 2, the selection unit 118 receives specification for a translated text candidate after the processing of steps S401 to S405 described with reference to FIG. 10. For example, the selection unit 118 receives the specification for the translated text from the shop employee who specifies through the input device 101. Here, the selection unit 118 causes the display unit of the input device 101 to display the translated text. Specifically, the selection unit 118 causes the display unit of the input device 101 to display the translated text by transmitting the translated text candidate (information on the translated text candidate) to the input device 101 using a communication unit (not shown in FIG. 1). It should be noted that the communication unit here may be achieved as a function of the advertisement text obtainment unit 106 and a function of the distribution unit 122.

In Embodiment 2, the selection unit 118 transmits all the translated text candidates created in the processing in step S405 to the input device 101. However, the selection unit 118 may, for example, transmit to the input device 101, only the translated text candidates which can be placed within the display area 104 among the translated text candidates.

Moreover, the selection unit 118 may, for example, exclude translated text candidates the character sizes of which are extremely small when displayed in the display area 104, from translated text candidates to be transmitted, and transmit only the translated text candidates of a predetermined character size or more to the input device 101. That is, the selection unit 118 may cause the display screen of the input device 101 to display at least one of the translated text candidates.

After the selection unit 118 transmits the translated text candidates to the input device 101, the display unit of the input device 101 displays the translated text candidates transmitted by the selection unit 118.

Here, the display unit of the input device 101 may display a translated text candidate in a display frame showing the size of the display area 104 so that the relative size of the translated text candidate to the size of the display area 104 is understood, rather than simply displaying the translated text candidate.

In general, the display unit of the input device 101 is smaller than the display unit 103*a* of the advertisement display device 103. Therefore, in many cases, the display frame displayed in the display unit of the input device 101 is smaller than the display area 104 in the display unit 103*a* of the advertisement display device 103. However, if the relative size of a translated text candidate to the size of the display area 104 in the display unit 103*a* of the advertisement display device 103 is known to the display unit of the input device 101, it is possible to select a translated text candidate in view of the balance of characters and others.

FIG. 11 is a figure showing an example of translated text candidates displayed by the display unit of the input device 101. It should be noted that FIG. 11 shows the display screen of the input device 101 achieved as a smart phone. It should be noted that the input device 101 shown in FIG. 11 includes a touch panel placed on the display screen as an input interface.

As shown in (a) in FIG. 11, the display unit of the input device 101 displays translated text candidates 301 to 304 surrounded by display frames in the display screen. It should be noted that such display frame may be displayed only for a translated text candidate whose character size is not greater than a predetermined character size.

A shop employee can confirm the relative size of a translated text candidate to the size of the display area 104 based on the display frames surrounding the translated text candidates 301 to 304. It should be noted that such display frames can be displayed by the selection unit 118 transmitting information indicating the size of the display area 104 and information on the translated text candidates to the input device 101.

The shop employee touches one of the areas displaying the translated text candidates 301 to 304 in the display screen of the input device 101 to select a translated text candidate that has been touched.

Information on the translated text candidate selected by the shop employee is transmitted by the input device 101 as specification for the translated text candidate. The selection unit 118 receives the specification for the translated text candidate through the communication unit. The selection unit 118 selects and outputs the translated text candidate that has been specified, as a translated text, from among translated text candidates.

Thus, in the advertisement translation system according to Embodiment 2, a translated text candidate is selected by a shop employee. Specifically, the selection unit 118 receives specification for a translated text candidate, and selects and outputs the translated text candidate that has been specified, as a translated text, from among translated text candidates. Moreover, the selection unit 118 causes the display unit of the input device 101 to display at least one of the translated text candidates to receive the specification for the translated text candidate from the input device 101 provided outside of the signage server 102.

This allows the selection unit 118 to select a translated advertisement text candidate according to a request from the shop employee.

It should be noted that the advertisement translation system according to Embodiment 2 may have the configuration in which the shop employee can change the display mode of a translated text candidate through the input device 101.

For example, in the display screen as shown in (a) in FIG. 11, when the input device 101 receives from the shop employee, the instruction to change the display mode in which the translated text candidate 304 is displayed in a small character size, the display unit of the input device 101 changes the display mode of the translated text candidate 304.

For example, when receiving the instruction to change a display mode from the shop employee, the display unit of the input device 101 displays the translated text candidate 304*a* such that the words in the translated text candidate 304 are separated into two lines as shown in (b) in FIG. 11. Here, the character size of the translated text candidate 304*a* is larger than the character size of the translated text candidate 304.

After that, when the shop employee selects the translated text candidate 304*a*, the input device 101 transmits as specification for the translated text candidate 304, information including (i) information on the translated text candidate 304 and (ii) its updated information (information for changing the display mode of the translated text candidate 304 to the display mode of the translated text candidate 304*a*). The selection unit 118 receives the specification through the communication unit. The selection unit 118 changes the display mode of the translated text candidate 304 to the display mode of the translated text candidate 304*a* based on the updated information, and selects and outputs the translated text candidate 304 which has been updated (translated text candidate 304*a*), as a translated text, from among translated text candidates.

Thus, as long as the advertisement translation system according to Embodiment 2 has the configuration in which the shop employee can change the display mode of a translated text candidate through the input device 101, the advertisement translation system can create translated advertisement content more flexibly, for example, in terms of a display mode.

It should be noted that the change of the display mode is not limited to the above example. For example, the configuration which allows the shop employee to change the font and color of the characters of a translated text candidate through the input device 101 is also possible.

Other Embodiment(s)

Embodiments 1 and 2 are described to exemplify the implementation of the present disclosure. However, the present disclosure is not limited to these embodiments, and is applicable to an embodiment to which change, replacement, addition, deletion, and so forth have been appropriately made. Moreover, a new embodiment can be made by combining the structural elements described in Embodiment 1.

Here, the following describes other embodiment(s) at once.

In the above embodiments, the collection unit 105 of the advertisement display device 103 collects linguistic information on a viewer viewing advertisement content, and transmits to the signage server 102.

However, the advertisement display device 103 does not have to include the collection unit 105. Instead, the linguistic information may be inputted to the input device 101, and the input device may transmit the linguistic information to the signage server 102.

For example, if a shop employee can identify the native language of the viewer viewing advertisement content, the shop employee can input to the input device 101, information on the native language of the viewer viewing the advertisement content identified by the shop employee. It should be noted that the subsequent operations of the signage server 102 and the advertisement display device 103 are similar to those described in Embodiment 1.

Moreover, in the above embodiments, the advertisement display device 103 includes the collection unit 105. However, as long as the collection unit 105 is provided near the advertisement display device 103, the collection unit 105 may be separated from the advertisement display device 103.

Moreover, in the above embodiments, the signage server 102 and the advertisement display device 103 are independent devices. However, the signage server 102 may include the display unit for displaying translated advertisement content. Likewise, the signage server 102 may include the collection unit 105. That is, the signage server 102 itself may function as the advertisement display device 103.

It should be noted that in the above embodiments, the translation unit 115 (text creation unit 110) creates the similar texts 111 to create translated text candidates. However, the similar texts 111 do not have to be created. For example, the translation unit 115 can create translated text candidates from an original advertisement text by translating the original advertisement text 108 using various kinds of translation applications.

Moreover, in the above embodiments, the similar texts 111 are created in the language used in the original advertisement text 108. This is to reduce the load of translation processing which starts after the linguistic information obtainment unit 114 obtains linguistic information, and create translated advertisement content in a short period of time, by creating and retaining similar texts beforehand during the creation of the advertisement content displaying an original text.

Here, the translation unit 115 may as described above create translated similar texts by translating one original advertisement text 108 into a predetermined language using various kinds of translation applications. Here, the predetermined language is a language into which the original advertisement text is likely to be translated, such as English.

In this case, only when a language indicated by the linguistic information obtained by the linguistic information obtainment unit 114 is different from the language used in translated similar texts, the translation unit 115 further translates each of the translated similar texts which have been created into the language indicated by the linguistic information to create translated text candidates.

Thus, it is possible to reduce the frequency of translation processing which starts after the linguistic information obtainment unit 114 obtains the linguistic information, and create translated advertisement content in a shorter period of time, by creating in advance translated similar texts which are similar texts translated into a language into which the original advertisement text is likely to be translated.

It should be noted that a method for creating a translated similar text is not limited to the method using the various kinds of translation applications. For example, the translation unit 115 may create translated similar texts by translating each word in an advertisement text into a predetermined language.

Generally, there is more than one translated word for one word in most cases. Therefore, translated similar texts can be created by combining translated words obtained for words.

Moreover, in the above embodiments, the signage server 102 includes the synonym dictionary 107 and the linguistic information DB 116, for example. However, a database or the like such as the synonym dictionary 107 and the linguistic information DB 116 is separated from the signage server 102. The signage server 102 may obtain data from the separately provided database or the like using a communication means such as the Internet.

It should be noted that in the above embodiments, the translation unit 115 (text creation unit 110) creates translated text candidates. However, the translation unit 115 may create translated text candidates one by one until a translated text candidate the full text of which can be displayed in a predetermined character size in a display area appears.

In this case, the signage server 102 further includes a determination unit for determining whether or not the full text of a translated text candidate created by the translation unit 115 can be displayed in the predetermined character size in the display area.

Here, the translation unit 115 creates a first translated text candidate by translating an advertisement text obtained by the advertisement text obtainment unit 106 into a language indicated by linguistic information obtained by the linguistic information obtainment unit 114. When the determination unit determines that it is not possible to display the full text of the first translated text candidate in the predetermined character size in the display area 104, the translation unit 115 creates a second translated text candidate different from the first translated text candidate.

The determination by the determination unit and creation of a translated text candidate by the translation unit 115 are repeated until a translated text candidate displayable in the display area 104 is created. It should be noted that the method for creating different translated text candidates is similar to the method described in the above embodiments.

Even in such configuration, the signage server 102 can display a translated advertisement text according to a layout without spoiling the design of advertisement content.

Moreover, the selection unit 118 in the above embodiments is not an essential structural element. The signage server 102 may be achieved as a device for performing only the processing to create translated text candidates.

It should be noted that in the above embodiments, each structural element may be a dedicated hardware or may be achieved by executing a software program suitable for the each structural element. The each structural element may be achieved by a program execution unit such as a CPU or a processor reading and executing a software program recorded on a recording medium such as a hard disk or a semiconductor memory. Here, the software which achieves advertisement translation devices according to the above embodiments and others is a program as described below.

That is, this program causes a computer to execute a method of translating an advertisement for translating an advertisement text displayed in a display area of a predetermined size in advertisement content, and displaying the translated advertisement text in the display area. The method includes: (i) obtaining the advertisement text; (ii) obtaining linguistic information indicating a target language into which the advertisement text is to be translated; and (iii) creating translated text candidates by translating the advertisement text obtained in (i) into the target language indicated by the linguistic information obtained in (ii).

Thus, the appended drawings and detailed description provide embodiments which the applicant regards as the best mode and other embodiment(s). These are provided to exemplify the subject matter described in Claims for those skilled in the art by referring to particular embodiments.

Therefore, the structural elements described in the appended drawings and the detailed description may include structural elements both essential and inessential for solving the problem. Therefore, even if described in the appended drawings and detailed description, these inessential structural elements should not be immediately regarded as essential structural elements.

Moreover, within the scope of Claims or the scope of equivalents thereof, various changes, replacements, additions, deletions, and so forth can be made to the above embodiments.

INDUSTRIAL APPLICABILITY

The advertisement display devices according to the present disclosure are widely applicable in the field of digital signage.

The invention claimed is:

1. An advertisement translation device for translating an advertisement text displayed in a display area of a predetermined size in advertisement content, and displaying the translated advertisement text in the display area, the advertisement translation device comprising:
   an advertisement text obtainment unit configured to obtain the advertisement text;
   a linguistic information obtainment unit configured to obtain linguistic information indicating a target language into which the advertisement text is to be translated;
   a translation unit configured to create translated text candidates by translating the advertisement text obtained by the advertisement text obtainment unit into the target language indicated by the linguistic information obtained by the linguistic information obtainment unit; and
   a selection unit configured to select and output as a translated text at least one of the translated text candidates, a full text of which is displayable in a predetermined character size in the display area,
   wherein the translation unit is further configured to perform on the advertisement text, replacement processing in which at least one word in the advertisement text is replaced by a synonym in a language used in the advertisement text to create similar texts, and to translate each of the similar texts created and the advertisement text into the target language indicated by the linguistic information to create the translated text candidates.

2. The advertisement translation device according to claim 1, wherein the selection unit is configured to select and output as the translated text, one of the translated text candidates whose corresponding similar text has a smallest number of words replaced by synonyms in the replacement processing.

3. The advertisement translation device according to claim 1,
   wherein each of words in the advertisement text is weighted according to a part of speech of the word, and
   the selection unit is further configured to select and output one of the translated text candidates as the translated text based on a sum of weights of words replaced by synonyms in the replacement processing.

4. An advertisement translation method for translating an advertisement text displayed in a display area of a predetermined size in advertisement content, and displaying the translated advertisement text in the display area, the advertisement translation method comprising:
   obtaining the advertisement text;
   obtaining linguistic information indicating a target language into which the advertisement text is to be translated;
   creating translated text candidates by translating the obtained advertisement text into the target language indicated by the obtained linguistic information;
   selecting and outputting as a translated text at least one of the translated text candidates, a full text of which is displayable in a predetermined character size in the display area;
   performing on the advertisement text, replacement processing in which at least one word in the advertisement text is replaced by a synonym in a language used in the advertisement text to create similar texts; and
   translating each of the similar texts created and the advertisement text into the target language indicated by the linguistic information to create the translated text candidates.

5. The advertisement translation method according to claim 4, wherein as the translated text, one of the translated text candidates whose corresponding similar text has a smallest number of words replaced by synonyms in the replacement processing is selected and outputted.

6. The advertisement translation method according to claim 4,
   wherein each of words in the advertisement text is weighted according to a part of speech of the word, and
   wherein as the translated text, one of the translated text candidates is selected and outputted based on a sum of weights of words replaced by synonyms in the replacement processing.

* * * * *